(12) United States Patent
Rajendran et al.

(10) Patent No.: US 11,593,433 B2
(45) Date of Patent: Feb. 28, 2023

(54) SYSTEM AND METHOD TO ANALYSE AND PREDICT IMPACT OF TEXTUAL DATA

(71) Applicant: Marlabs Innovations Private Limited, Bangalore (IN)

(72) Inventors: Senthil Nathan Rajendran, Bangalore (IN); Selvarajan Kandasamy, Bengaluru (IN); Tejas Gowda BK, Bangalore (IN); Mitali Sodhi, Bangalore (IN)

(73) Assignee: MARLABS INCORPORATED

( * ) Notice: Subject to any disclaimer, the term of this patent is extended or adjusted under 35 U.S.C. 154(b) by 688 days.

(21) Appl. No.: 16/533,904

(22) Filed: Aug. 7, 2019

(65) Prior Publication Data

US 2020/0050637 A1     Feb. 13, 2020

(30) Foreign Application Priority Data

Aug. 7, 2018   (IN) .............................. 201841029703

(51) Int. Cl.
```
G10L 15/32      (2013.01)
G06F 16/9032    (2019.01)
G06F 16/903     (2019.01)
G06F 16/906     (2019.01)
G06F 16/951     (2019.01)
```
(52) U.S. Cl.
CPC ...... *G06F 16/90332* (2019.01); *G06F 16/906* (2019.01); *G06F 16/90344* (2019.01); *G06F 16/951* (2019.01)

(58) Field of Classification Search
None
See application file for complete search history.

(56) References Cited

U.S. PATENT DOCUMENTS

| | | | |
|---|---|---|---|
| 7,523,085 B2 | 4/2009 | Nigam et al. | |
| 8,433,559 B2 * | 4/2013 | Madan .................. | G06F 40/242 704/4 |
| 8,640,251 B1 * | 1/2014 | Lee ....................... | G06F 16/164 707/786 |
| 9,092,802 B1 | 7/2015 | Akella | |
| 9,727,637 B2 | 8/2017 | Visotski et al. | |
| 2002/0065857 A1 * | 5/2002 | Michalewicz ........ | G06F 16/355 715/234 |
| 2008/0228675 A1 * | 9/2008 | Duffy .................... | G06F 40/295 707/999.005 |

(Continued)

*Primary Examiner* — Neeraj Sharma
(74) *Attorney, Agent, or Firm* — Jason C. Cameron

(57) ABSTRACT

System and method to analyze and predict impact of textual data are provided. The system also includes a processing subsystem configured to select textual data from a plurality of data sets stored in a memory, to extract data from external sources using crawling, to identify at least one context of the textual data using one or more identification methods. The processing subsystem includes an NLP module configured to match the textual data with NLP frameworks using a mapping method based on a plurality of parameters, to apply feature engineering and transformation on the textual data to extract a plurality of features from the plurality of data sets and to analyze matched textual data of the textual using at least one analysis method. The processing subsystem also includes a predictive module configured to predict one or more future values of the analyzed textual data using the one or more predictive methods.

8 Claims, 4 Drawing Sheets

(56) References Cited

U.S. PATENT DOCUMENTS

| | | | |
|---|---|---|---|
| 2010/0004925 A1* | 1/2010 | Ah-Pine | G06F 16/355 704/9 |
| 2011/0087961 A1* | 4/2011 | Fitusi | G06F 40/274 715/261 |
| 2011/0191098 A1* | 8/2011 | Thomas | G06F 40/237 704/9 |
| 2012/0259617 A1* | 10/2012 | Indukuri | G06F 40/279 704/9 |
| 2014/0019443 A1 | 1/2014 | Golshan | |
| 2014/0229164 A1* | 8/2014 | Martens | G06F 40/169 704/9 |
| 2017/0046625 A1* | 2/2017 | Takaai | G06F 16/3329 |
| 2017/0235848 A1* | 8/2017 | Van Dusen | G06N 5/02 705/12 |
| 2018/0285461 A1* | 10/2018 | Smith | G06F 16/3325 |
| 2019/0034483 A1* | 1/2019 | Millius | G06N 20/00 |
| 2019/0147034 A1* | 5/2019 | Maneriker | G06F 40/169 704/9 |

\* cited by examiner

SYSTEM AND METHOD TO ANALYSE AND PREDICT IMPACT OF TEXTUAL DATA

CROSS-REFERENCE TO RELATED APPLICATION

This application claims the benefit of complete patent application having Patent Application No. 201841029703 filed on Aug. 7, 2018 in India.

FIELD OF INVENTION

Embodiments of the present disclosure relate to data prediction, and more particularly to system and method to analyze and predict impact of textual data.

BACKGROUND

Natural Language Processing is a type of analysis method in Machine Learning or Artificial Intelligence which deals with extracting information from unstructured data and using extracted data to analyze and predict various trends and behavioural pattern and its influence on business performance.

In one approach, the system includes a processor configured to identify a process to analyze data received from a source. Moreover, the data received from the source is a type of unstructured data which is in a form of natural language. Furthermore, the system searches and matches a Natural Language Processing (NLP) framework to predict and analyze the data received. However, the data received from the source could be either internal or external. Also, the data received does not depend on a use case or a specific context which lowers an efficiency of the system. Furthermore, the system requires a special set of instructions to analyze and predict the data, which involves high dependency on manual task from a user. Such dependency causes another factor to lower the efficiency of the system and also slows down the system. Moreover, in such system, the user must correlate the derived insights obtained during analysis of the data with the key performance indication. Such correlation by the user is yet another factor for less efficiency and delay of the system.

Hence, there is a need for an improved system and method to analyze and predict impact of textual data to address the aforementioned issue.

BRIEF DESCRIPTION

In accordance with an embodiment of the present disclosure, a system to analyze and predict impact of textual data is provided. The system includes a memory. The memory is configured to store a plurality of data sets acquired from one or more sources. The system also includes a processing subsystem operatively coupled to the memory. The processing subsystem is configured to select textual data from the plurality of data sets. The processing subsystem is also configured to extract data from one or more external sources through web crawling. The processing subsystem is also configured to identify at least one context of the textual data using one or more identification methods. The processing subsystem includes a natural language processing (NLP) module. The NLP module is configured to match the textual data with at least one natural language processing (NLP) frameworks using a mapping method based on a plurality of parameters. The (NLP) module is also configured to apply feature engineering and transformation on the textual data to extract a plurality of features from the plurality of data sets. The NLP module is also configured to analyze matched textual data of the textual using at least one analysis method, wherein the at least one analysis method includes at least one of a part of speech (POS) tagging, a sentiment method, a topic modelling, a clustering method and a document classification method. The NLP module is also configured to store an analyzed result of the textual data in the memory. The processing subsystem also includes a predictive module. The predictive module is configured to obtain the analyzed result of the textual data from the memory. The predictive module is also configured to predict one or more future values of the analyzed textual data using the one or more predictive methods based on an analysis result.

In accordance with another embodiment, a method for analyzing and predicting impact of textual data is provided. The method includes acquiring a plurality of data sets from one or more sources. The method also includes selecting textual data from the plurality of data sets. The method also includes identifying at least one context of the textual data using one or more identification methods. The method also includes matching the textual data with at least one natural language processing (NLP) frameworks using a mapping method based on a plurality of parameters. The method also includes applying feature engineering and transformation on the textual data to extract a plurality of features from the plurality of data sets. The method also includes analyzing matched textual data using at least one analysis method. The method also includes predicting one or more future values of the analyzed textual data using the one or more machine learning models based on an analysis result.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
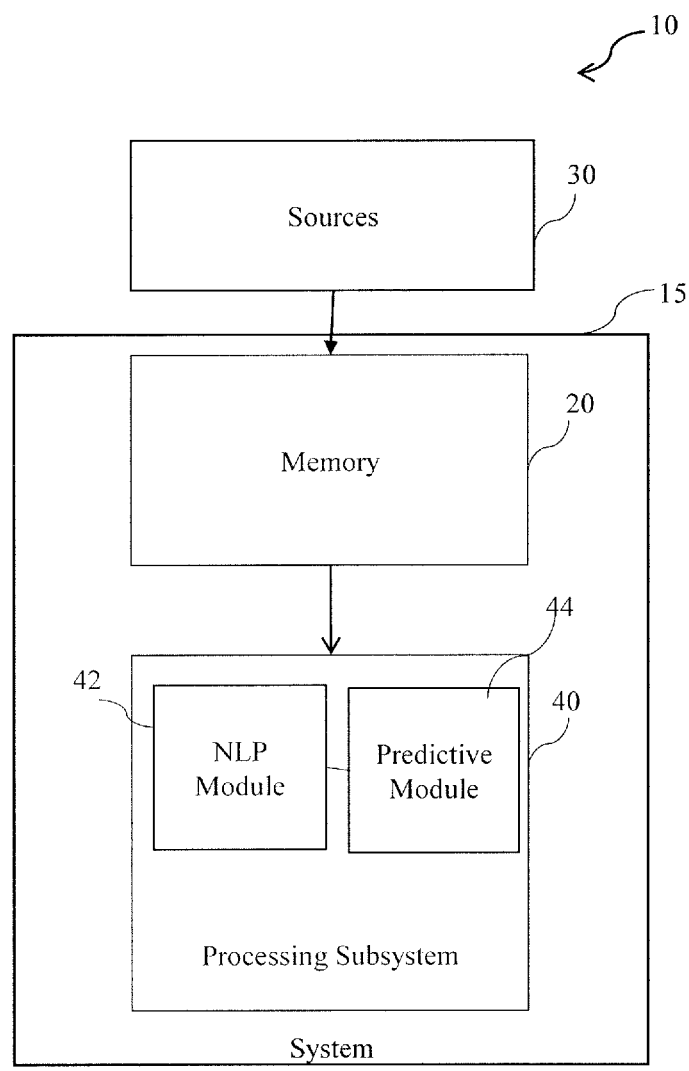
FIG. 1 is a block diagram representation of a system to analyze and predict impact of textual data in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relates to system and method to analyze and predict impact of textual data. The system includes a memory. The memory is configured to store a plurality of data sets acquired from one or more sources. The system also includes a processing subsystem operatively coupled to the memory. The processing subsystem is configured to select textual data from the plurality of data sets. The processing subsystem is also configured to extract data from one or more external sources through web crawling. The processing subsystem is also configured to identify at least one context of the textual data using one or more identification methods. The processing subsystem includes a natural language processing (NLP) module. The NLP module is configured to match the textual data with at least one natural language processing (NLP) frameworks using a mapping method based on a plurality of parameters. The NLP module is also configured to apply feature engineering and transformation on the textual data to extract a plurality of features from the plurality of data sets. The NLP module is also configured to analyze matched textual data of the textual using at least one analysis method, wherein the at least one analysis method includes at least one of a part of speech (POS) tagging, a sentiment method, a topic modelling, a clustering method and a document classification method. The NLP module is also configured to store an analyzed result of the textual data in the memory. The processing subsystem also includes a predictive module. The predictive module is configured to obtain the analyzed result of the textual data from the memory. The predictive module is also configured to predict one or more future values of the analyzed textual data using the one or more predictive methods based on an analysis result.

FIG. 1 is a block diagram 10 representation of a system 15 to analyze and predict impact of textual data in accordance with an embodiment of the present disclosure. The system 15 includes a memory 20. The memory 20 is configured to store a plurality of data sets acquired from one or more sources 30. In one embodiment, the memory 20 may be a random-access memory (RAM), a read only memory (ROM), a cache memory or a flash memory. In one exemplary embodiment, the plurality of data sets may be acquired from at least one of a web, a manual entry of data, a local data set, an internal storage, an external storage and an experimental data set. In such embodiment, the plurality of data sets may include a plurality of structured data, a plurality of unstructured data or a plurality of semi-structured data. In one exemplary embodiment, the plurality of data sets may include textual data or categorical data. In one specific embodiment, the memory 20 may correspond to a database of the system 15.

The system 15 also includes a processing subsystem 40 operatively coupled to the memory 20. The processing subsystem 40 is configured to select textual data from the plurality of data sets. In one embodiment, the textual data may be selected by a user from the plurality of data sets. In another embodiment, the processing subsystem 40 may select the textual data from the plurality of data sets based on a pre-defined set of instructions. In yet another embodiment, the textual data may be selected by the processing subsystem 40 from at least one of the use case, the statistical influence and the previous predictive sample. The processing subsystem is also configured to extract data from one or more external sources through web crawling. As used herein, the term 'web crawling' is defined as a process for browsing the web to extract the data from the one or more external sources.

Furthermore, the processing subsystem 40 is also configured to identify at least one context of the textual data using one or more identification methods. In one embodiment, the one or more identification methods may include one or more machine learning models. As used herein, the machine learning model is defined as a model built within a computer system using artificial intelligence which often adopts statistical techniques and computational learning theory in order to perform at least one said task. In one embodiment, the processing subsystem 40 may identify the at least one context from the built corpus using the one or more machine learning models.

The processing subsystem 40 includes a natural language processing NLP module 42. The (NLP) module 42 is configured to match the textual data with at least one natural language processing (NLP) framework using a mapping method based on a plurality of parameters. In one embodiment, the mapping method may correspond to an artificial intelligence technique. As used herein, the artificial intelligence technique is defined as a type of intelligence demonstrate by a machine which is in contrast to the natural intelligence demonstrated by humans. Furthermore, in one exemplary embodiment, if the artificial intelligence technique fails to match the textual data with an appropriate at least one NPL framework which may be stored in the database corresponding to the memory 20, the artificial intelligence technique may be used by the processing subsystem 40 to search the one or more external sources in order to find the appropriate at least one NPL framework which matches the textual data. Furthermore, if the user is not satisfied from the at least one NPL framework found from the one or more external sources, the user may create a new enterprise framework based on user's preferences. In one embodiment, the plurality of parameters may include the use case, the statistical influence and the previous predictive sample.

The NLP module 42 is also configured to apply feature engineering and transformation on the textual data to extract a plurality of features from the plurality of data sets. As used herein, feature engineering is the process of using domain knowledge of the data to create features that make one or more machine learning models work.

The NLP module 42 is also configured to analyze matched textual data using at least one analysis method. Furthermore, the at least one analysis method includes at least one of a part of speech (POS) tagging, a sentiment method, a topic modelling, a clustering method and a document classification method. The NLP module 42 is also configured to store an analyzed result of the textual data in the memory 20.

In one exemplary embodiment, upon selecting the at least one NPL framework, the textual data of the textual data may be split into a training data model and a test data mode. Further, the processing subsystem 40 may use the training data model for self-learning. Upon self-learning of the training data model, the processing subsystem 40 tests the training data model for accuracy of the same. Furthermore, if the training data model matches an accuracy criterion, the built data model may be analyzed using the at least one analysis method.

The processing subsystem 40 also includes a predictive module 44 operatively coupled to the natural language processing NLP module 42. The predictive module 44 is configured to obtain the analyzed result from the memory. The predictive module 44 is also configured to predict one or more future values of the analyzed textual data using the one or more predictive methods based on the analyzed result. In one embodiment, the processing subsystem 40 may predict the one or more future values of a sentiment score which may be generated based on the NPL analysis method.

In one further embodiment, the system 15 may include a visualization engine (not shown in FIG. 1) operatively coupled to the processing subsystem 40. In one embodiment, the one or more predicted future values may be converted into dashboards and data visualizations by the visualization engine. Further, a plurality of narratives for the visualization of the may be generated automatically. The one or more predicted values may be displayed in a form of a story. In such embodiment, the user may store the analysis result and the insights in the memory. Further, the user may choose an appropriate KPI for correlation.

In another embodiment, the system 15 may include a representation module operatively coupled to the visualization engine. The representation module (not shown in FIG. 1) may be configured to represent the one or more predicted future values or the analysis result in one or more forms. In such embodiment, the one or more predicted future values or the analysis result may be represented in at least one of a graph, a chart, a table or an insight.

Figure 2:
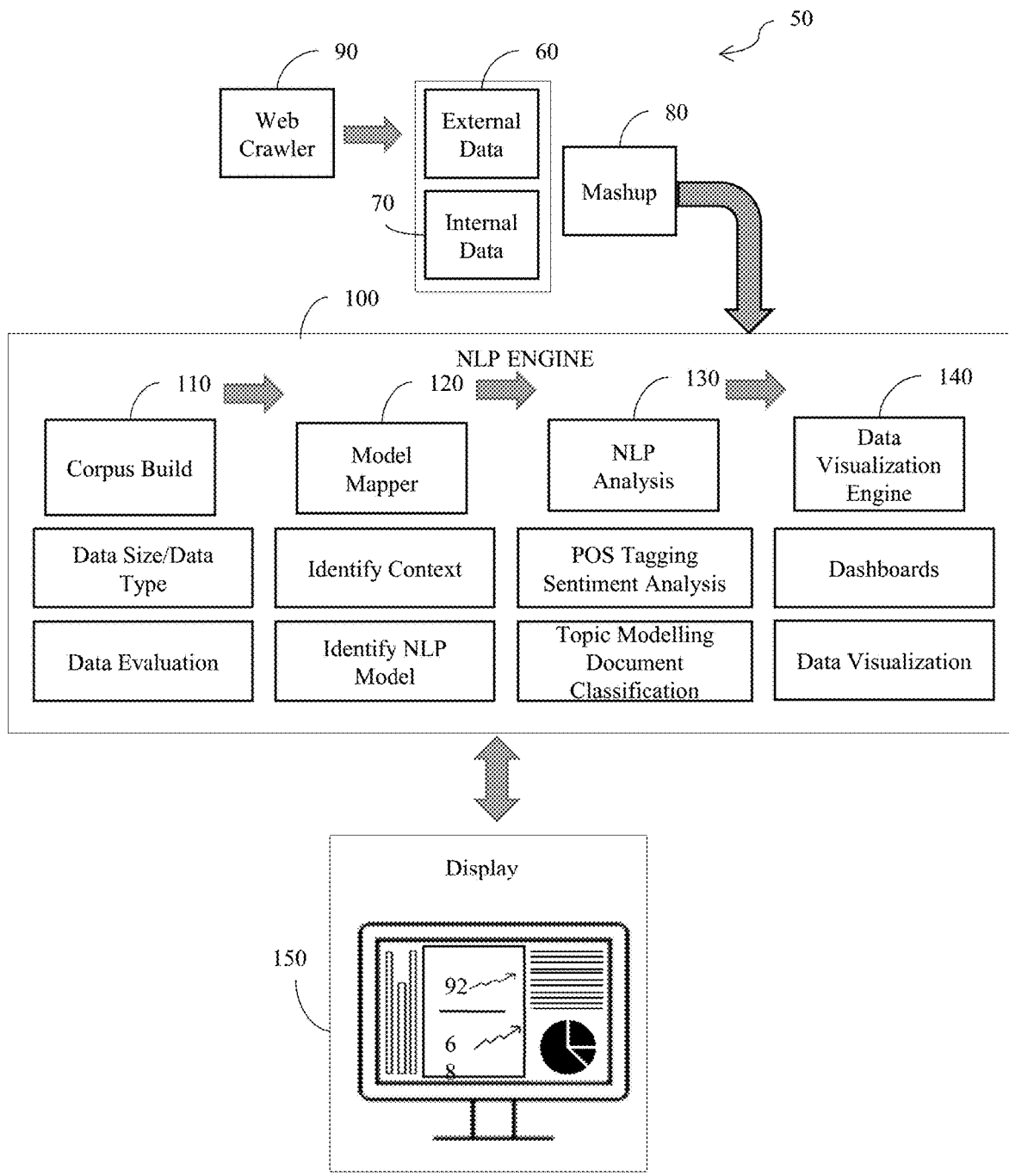
FIG. 2 is a schematic representation of an exemplary embodiment of the system to analyze and predict impact of the textual data of FIG. 1 in accordance with an embodiment of the present disclosure.

FIG. 2 is a schematic representation of an exemplary embodiment of the system 50 to analyze and predict impact of the textual data of FIG. 1 in accordance with an embodiment of the present disclosure. A memory (not shown in FIG. 2) of the system 50 may mash up one or more external data sets 60 and one or more internal data sets 70 to generate the plurality of data sets using a mashup module 80. The one or more external data sets 60 is obtained from a web crawler 90. Further, the one or more internal data sets 70 is obtained from a plurality of already existing data set or a plurality of previously verified data set which may be present in the memory. Further, the plurality of data sets may be transmitted to a processing subsystem not shown in FIG. 2 to pre-process the plurality of data sets. On processing the plurality of data sets, textual data may be selected by the processing subsystem. The system 50 includes a natural language processing (NLP) engine 100 located within the processing subsystem.

Furthermore, the textual data selected by the processing subsystem is subjected to a corpus build module 110 located within the NLP engine 100 and configured to build a corpus. Furthermore, on building the corpus, the processing subsystem identifies context of the built corpus. Consequently, the built corpus is mapped with an appropriate NLP model by a model mapper 120, wherein the model mapper 120 is located within the NLP engine 100.

On mapping the built corpus with the NLP model, the NLP engine 100 identifies one or more feature engineering and transformations required to predict the built corpus. Furthermore, the selected one or more feature engineering and the transformations are run on the built corpus to extract a plurality of features. The built corpus is now transmitted to an NLP analysis module 130 which is located within the NLP engine 100. The NLP analysis module 130 identifies one or more analysis method to analyze the built corpus. Also, the processing subsystem selects an appropriate analysis method for regression. A prediction engine (not shown) also trains and testes the built corpus in order to predict one or more future values of the built corpus.

In addition, predicted result is passed to a data visualization engine 140. The data visualization engine 140 generates one or more of a chart, a graph or a table based on the predicted result. The processing subsystem further generates a model summery based on the predicted results. Also, the predicted result along with generated insights are stored in the memory. Furthermore, the predicted result is displayed on a display 150 which is operatively coupled to the processing subsystem.

Furthermore, the system 50 which includes the memory and the processing subsystem of FIG. 2 is substantially similar to a system 15 which includes a memory 20 and a processing subsystem 40 of FIG. 1.

Figure 3:
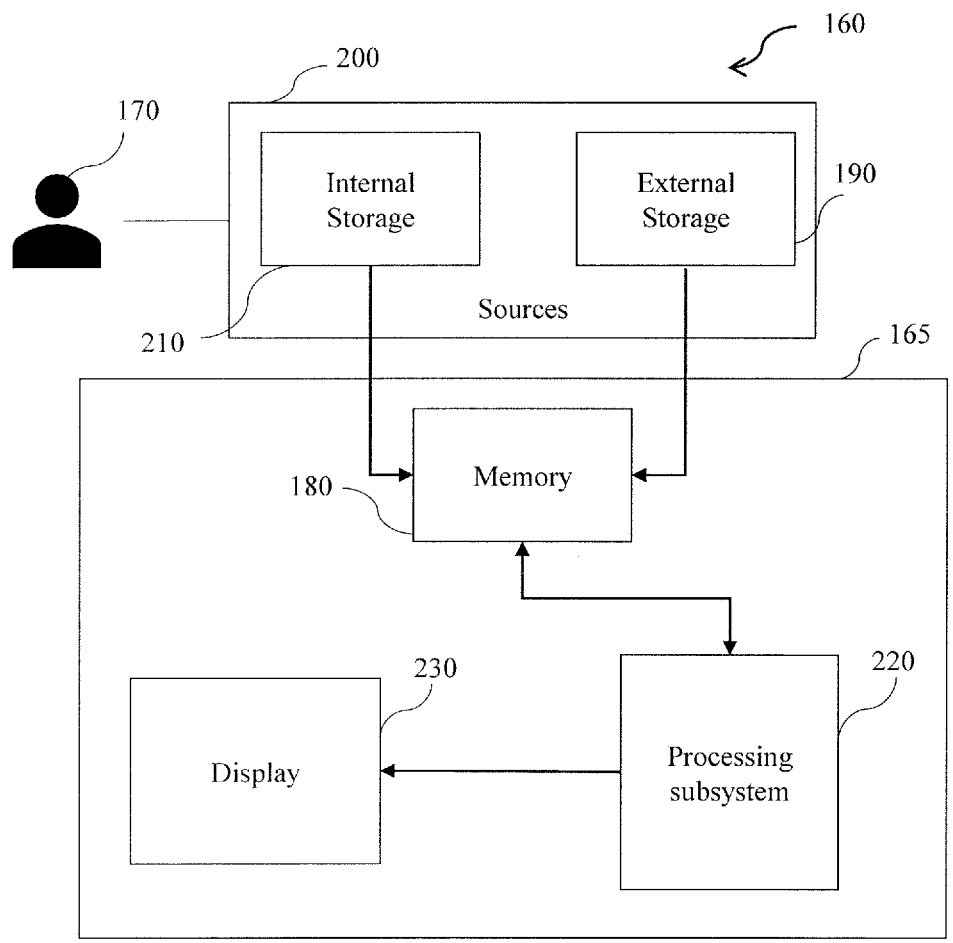
FIG. 3 is a block diagram representation of an exemplary embodiment of a system to analyze and predict impact of textual data associated to an article of FIG. 1 in accordance with an embodiment of the present disclosure.

FIG. 3 is a block diagram 160 representation of an exemplary embodiment of a system 165 to analyze and predict impact of textual data associated to an article of FIG. 1 in accordance with an embodiment of the present disclosure. A user 170 uploads the article to a memory 180 of the system 165 through an external storage 190 means wherein the article is in an unstructured data format. The uploaded article is stored in the memory 180. Further, a plurality of data sets related to the article is acquired from one or more other sources 200 such as the external storage source 190 and an internal storage source 210. Upon acquiring the plurality of data sets from different sources, the plurality of data sets is mashed and is stored in the memory 180 for further analysis and prediction of sentiment and thoughts related to the article.

Furthermore, as the user 170 selects the article for further analysis and prediction, a processing subsystem 220 builds a corpus by selecting textual data from the uploaded article. Consequently, the processing subsystem 220 identifies context of the built corpus using a first machine learning model to correctly match the textual data to an appropriate natural language processing (NLP) framework for further analysis. Furthermore, the processing subsystem 220 identities a right NLP framework based on the context, use case and nature of the built corpus related to the article using an artificial intelligence technique.

Upon identifying the right NLP framework, the processing subsystem 220 applies a POS tagging, a sentiment technique, a topic modelling, a clustering method and a document classification technique on the built corpus to analyze the article. Further, based on the analyses done on the built corpus, the processing subsystem 220 analyses a sentiment and a future value of the article. The analyzed sentiment value and the analyzed future value is stored in the memory 180.

Also, a statistical model chooses the right technique to select a right second machine learning model based on a data quality, data volume, computational resources required, data type, the use case, historical model performance. Upon selecting the right second machine learning model, the processing subsystem 220 splits the built corpus into a training model and a test model. The processing subsystem 220 uses the training model for self-learning. Consequently, the processing subsystem 220 tests the training model for accuracy with respect to a pre-defined accuracy rate.

Furthermore, based on the accuracy rate of the built corpus, the built corpus is subjected to prediction of the analyzed sentiment and the analyzed future value using the second machine learning model. In addition, the processing subsystem 220 determines an impact of the analyzed sentiment using the second machine learning model.

The predicted result is converted into dashboards and data visualizations by the processing subsystem 220. In addition, a plurality of narratives for the visualization of the predicted result is also generated by the processing subsystem 220. The predicted result is displayed in form of stories on a display 230 which is operatively coupled to the processing subsystem 220. The stories are viewed by the user 170. Also, the user 170 chooses an enterprise database to store the analyzed result and the insights which is operatively coupled to the memory 180. The user 170 also selects an appropriate key performance indicator (KPI) for correlation with the prediction of the article.

Furthermore, the sources 200, the memory 180 and the processing subsystem 220 are substantially similar to sources 30, a memory 20 and a processing subsystem 40 of FIG. 1.

Figure 4:
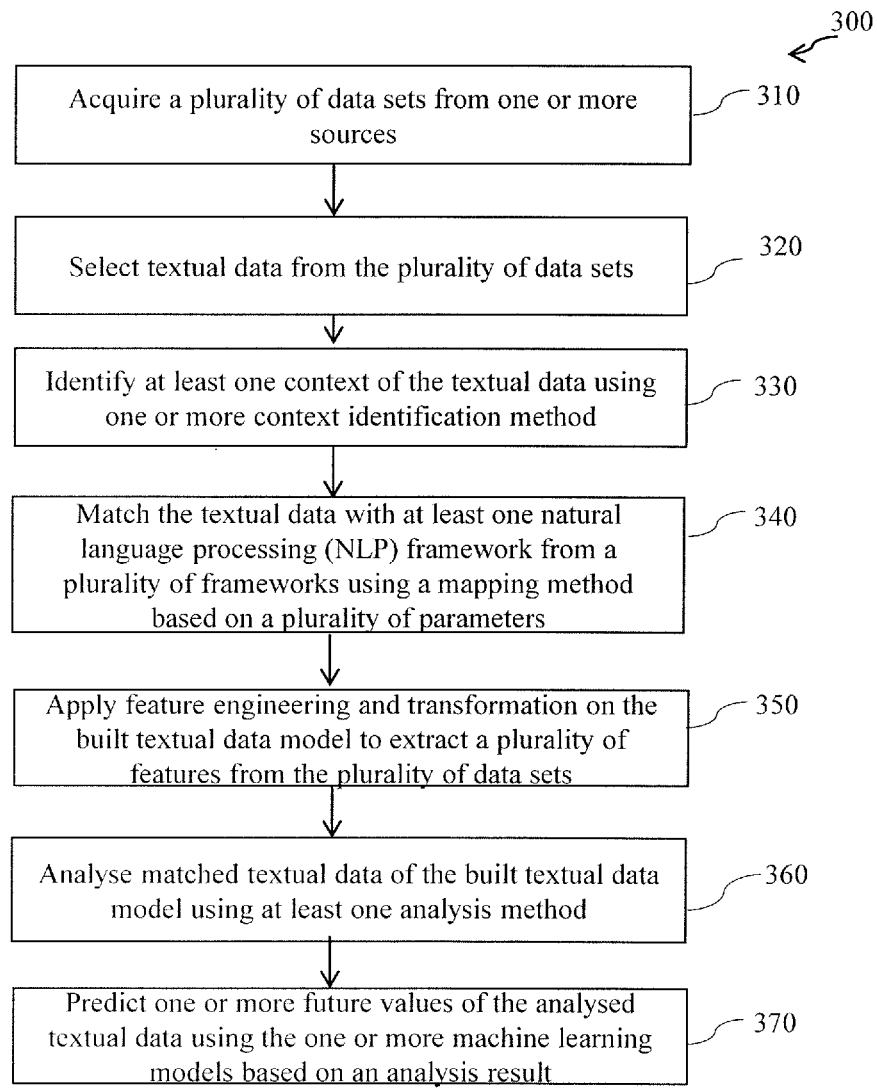
FIG. 4 is a flow chart representing steps involved in a method for analyzing and predicting impact of textual data in accordance with an embodiment of the present disclosure.

FIG. 4 is a flow chart representing steps involved in a method for analyzing and predicting impact of textual data in accordance with an embodiment of the present disclosure. The method 300 includes acquiring a plurality of data sets from one or more sources in step 310. In one embodiment, acquiring the plurality of data sets from the one or more sources may include acquiring the plurality of data sets from at least one of an internal storage and an external storage. In another embodiment, acquiring the plurality of data sets from the one or more sources may include acquiring the plurality of data sets from at least one of a web, a manual entry of data, a local data set, an internal storage, an external storage and an experimental data set.

The method 300 also includes selecting textual data from the plurality of data sets in step 320. In one embodiment, selecting the textual data from the plurality of data sets may include selecting the textual data based on a plurality of parameters such as a use case, a statistical influence and a previous predictive sample.

Furthermore, the method 300 includes identifying at least one context of the textual data using one or more identification methods in step 340. In one embodiment, identifying the at least one context of the textual data may include identifying the at least one context of the textual data using one or more machine learning models.

The method 300 also includes matching the textual data with at least one natural language processing NLP framework using a mapping method based on a plurality of parameters in step 350. In one embodiment, matching the textual data with the at least one NLP framework may include matching the textual data with the at least one NLP framework from a stored database. In another embodiment, matching the textual data with the at least one NLP framework may include matching the textual data with the at least one NLP framework by searching the at least one NLP framework from one or more external open sources. In yet another embodiment, matching the textual data with the at least one NLP framework may include enabling a user to create the at least one framework based on one or more user preferences.

The method 300 also includes applying feature engineering and transformation on the textual data to extract a plurality of features from the plurality of data sets in step 360. In one embodiment, applying feature engineering and transformation on the built textual data model may include applying the transformation on the built textual data model based on the use case, a data quality, a data type and a data volume for extracting the plurality of features from the plurality of data sets.

The method 300 also includes analyzing matched textual data using at least one analysis method in step 370. In one embodiment, analyzing the matched textual data may include analyzing the matched textual data of the textual data using at least one of a part of speech (POS) tagging, a sentiment method, a topic modelling, a clustering method and a document classification method.

The method 300 also includes predicting one or more future values of the analyzed textual data using the one or more predictive methods based on an analysis result in step 380. In one embodiment, predicting the one or more future values of the analyzed textual data may include predicting one or more future values of the analyzed textual data based on the types of analyses done on the textual data.

In one further embodiment, the method 300 may include representing one or more predicted future values in one or more forms. In such embodiment, representing the one or more predicted future values in the one or more forms may include representing the one or more predicted future values in at least one of a graph, a chart, a table or an insight. In such another embodiment, representing the one or more predicted future values may include representing the one or more predicted future values in a form of a story.

In another embodiment, the method 300 may include storing the one or more predicted future values or one or more insights in the memory. In such embodiment, storing the one or more predicted future values may include storing the one or more predicted future values in a database.

Various embodiments of the system and method to analyze and predict impact of textual data enable the system to acquire the plurality of data sets from both the external source and the internal source. Furthermore, as the system uses the one or more machine learning models and the artificial intelligence technique, the system reduces the dependency of manual task from the user. Henceforth, increasing the efficiency of the system and decreasing the delay.

In addition, the system uses different parameters such as the use case, the statistical influence and the previous predictive sample which adds on to the system to increase the efficiency of the prediction of the textual data and hence the efficiency of the system. The system also enables the user to analyze large scare unstructured data in an efficient and a faster method.

Also, the system automatically crawls the internal data and the external data and builds the corpus automatically to analyze the textual data. In addition, the system also automatically adjusts the model parameters and chosen variables based on a feedback, wherein the feedback is the difference between the actual result and the predicted result. The system also automatically tracks and monitors the model performance.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependant on other acts may be performed in parallel with the other acts. The scope of embodiments is by no means limited by these specific examples.

We claim:

1. A system to analyze and predict impact of textual data comprising:
    a memory configured to store a plurality of data sets acquired from one or more sources;
    a processing subsystem operatively coupled to the memory, and configured to:
        select textual data from the plurality of data sets;
        extract data from one or more external sources through web crawling;
        identify at least one context of the textual data using one or more context identification methods, wherein at least one or more context identification methods comprises at least one or more machine learning models;
    wherein the processing subsystem comprises:
        a natural language processing (NLP) module configured to:
            match the textual data with at least one natural language processing (NLP) framework from a plurality of frameworks obtained from the one or more sources using a mapping method based on a plurality of parameters;
            apply feature engineering and transformation on the textual data to extract a plurality of features from the plurality of data sets wherein the feature engineering and the transformation is applied on the textual data based on a use case, a data quality, a data type and a data volume for extracting the plurality of features from the plurality of data sets;
            analyze matched textual data using at least one analysis method, wherein the at least one analysis method comprises at least one of a part of speech (POS) tagging, a sentiment method, a topic modelling, a clustering method and a document classification method;
            store an analyzed result of the textual data in the memory;
        a predictive module operatively coupled to the natural language processing (NLP) module, and configured to:
            obtain the analyzed result of the textual data from the memory;
            predict one or more future values of the analyzed textual data using one or more machine learning models based on the analyzed result;
        a data visualization engine configured to:
            generate one or more of a chart, a graph and a table based on the predicted one or more future values; and
            generate a model summary based on the predicted one or more future values.

2. The system as claimed in claim 1, wherein the plurality of data sets comprises at least one of a plurality of structured data sets, a plurality of unstructured data sets and a plurality of semi-structured data sets.

3. The system as claimed in claim 1, wherein the plurality of parameters comprises at least one of a use case, a statistical influence and a previous predictive sample.

4. The system as claimed in claim 1, further comprises a representation module operatively coupled to the processing subsystem, and configured to represent one or more predicted future values in one or more forms.

5. A method for analyzing and predicting impact of textual data comprising:
    acquiring a plurality of data sets from one or more sources;
    selecting textual data from the plurality of data sets;
    identifying at least one context of the textual data using one or more context identification methods;
    matching the textual data with at least one natural language processing (NLP) framework from a plurality of frameworks obtained from the one or more sources using a mapping method based on a plurality of parameters;
    applying feature engineering and transformation on the textual data to extract a plurality of features from the plurality of data sets wherein the feature engineering and the transformation is applied on the textual data based on a use case, a data quality, a data type and a data volume for extracting the plurality of features from the plurality of data sets;
    analyzing matched textual data using at least one analysis method;
    predicting one or more future values of the analyzed textual data using one or more machine learning models based on an analysis result;
    generating one or more of a chart, a graph and a table based on the predicted one or more future values; and
    generating a model summary based on the predicted one or more future values.

6. The method as claimed in claim 5, wherein acquiring the plurality of data sets from one or more sources comprises acquiring the plurality of data from at least one of a web, a manual entry of data, a local data set, an internal storage, an external storage and an experimental data set.

7. The method as claimed in claim 5, wherein analyzing the matched textual data using the at least one analysis method comprises analyzing the matched textual data using at least one of a part of speech (POS) tagging, a sentiment method, a topic modelling, a clustering method and a document classification method.

8. The method as claimed in claim 5, further comprises representing one or more predicted future values of the textual data in one or more forms.

\* \* \* \* \*